Sept. 15, 1964  G. B. CLIFT, JR  3,148,542
LIQUID LEVEL GAUGING APPARATUS
Filed Feb. 9, 1961  7 Sheets-Sheet 1

REMOTE CENTRAL
DATA STATION

INVENTOR
*Gilbert B. Clift, Jr.*

BY *Stevens, Davis, Miller & Mosher*
ATTORNEYS

Sept. 15, 1964 G. B. CLIFT, JR 3,148,542
LIQUID LEVEL GAUGING APPARATUS
Filed Feb. 9, 1961 7 Sheets-Sheet 2

INVENTOR
Gilbert B. Clift, Jr.
BY
Stevens, Davis, Miller + Mosher
ATTORNEYS

Sept. 15, 1964     G. B. CLIFT, JR     3,148,542
LIQUID LEVEL GAUGING APPARATUS
Filed Feb. 9, 1961     7 Sheets-Sheet 4
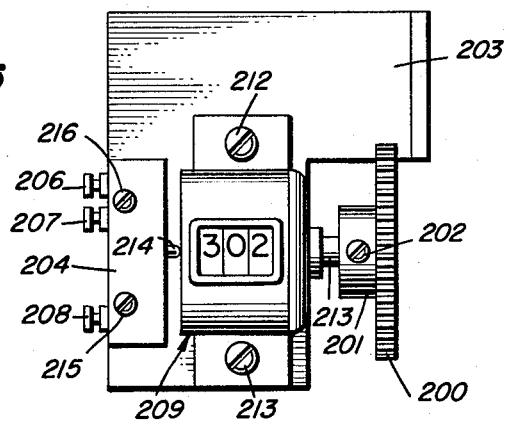
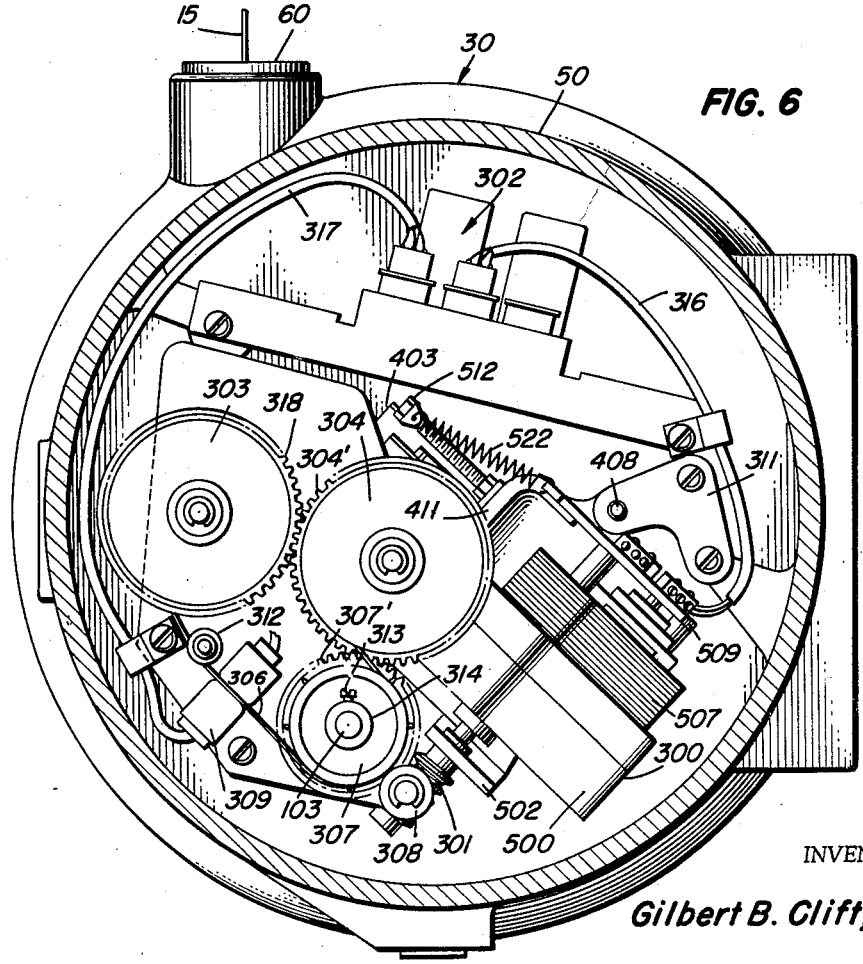
INVENTOR
Gilbert B. Clift, Jr.
BY *Stevens, Davis, Miller & Mosher*
ATTORNEYS

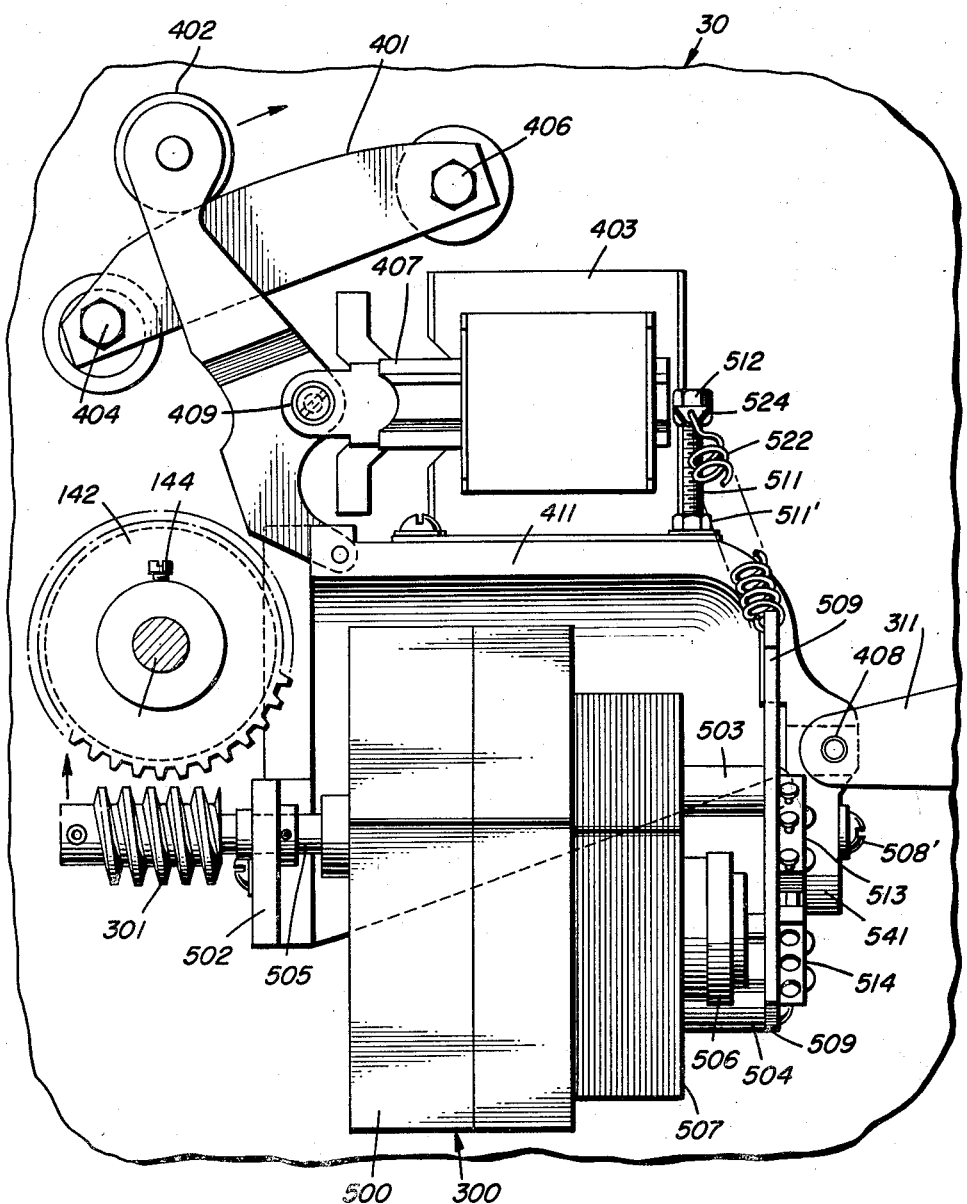

Sept. 15, 1964  G. B. CLIFT, JR  3,148,542
LIQUID LEVEL GAUGING APPARATUS
Filed Feb. 9, 1961  7 Sheets-Sheet 6

INVENTOR
Gilbert B. Clift, Jr.
BY Stevens, Davis, Miller+Mosher
ATTORNEYS

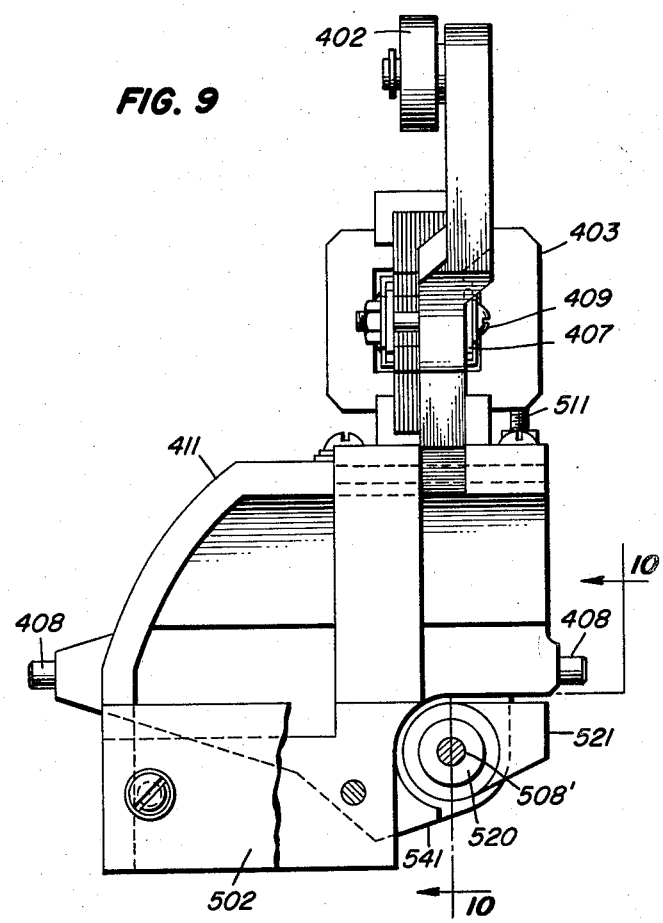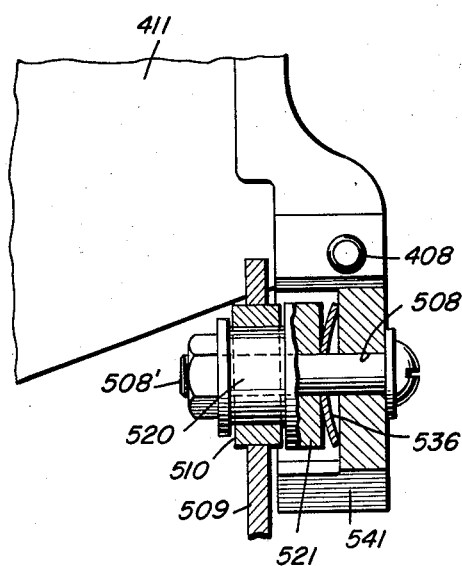

United States Patent Office 3,148,542
Patented Sept. 15, 1964

3,148,542
LIQUID LEVEL GAUGING APPARATUS
Gilbert B. Clift, Jr., Houston, Tex., assignor to Texas Instruments Incorporated, Dallas, Tex., a corporation of Delaware
Filed Feb. 9, 1961, Ser. No. 88,197
7 Claims. (Cl. 73—308)

The present invention relates to apparatus of the kind that is used to determine the level of a liquid within a storage tank or other container and constitutes an improvement over the disclosure of the copending application of Richard L. Yarnall, Serial Number 743,606, filed June 25, 1958, now U.S. Patent No. 3,081,547, and owned by the assignee of the instant disclosure.

There have been many systems devised heretofore for gauging the level of a liquid in a tank by means of mechanical apparatus involving the use of a float having a cable or tape attached thereto which extends over pulleys to the tank exterior where visual indicia correlated to the liquid level height can be read directly at the tank. However, in view of present-day development of "tank farms" where a multitude of storage tanks cover a large land area, direct reading of the liquid level at each individual tank is not practical.

It is therefore more practical and desirable to be able, at any instant, to ascertain the liquid level in any one of a plurality of storage tanks from a station remote thereto, either by electrical interrogation of each tank or by mechanism functioning automatically, and having such information electrically transmitted to the remotely located station.

The present invention features a housing having a mechanical side and electrical side for the liquid level gauge with only a single through port there between which requires sealing. The mechanical side, or the side containing the float cable or tape take up mechanism, being subject to vapors and liquid out of the tank to be gauged, is completely sealed from the atmosphere surrounding the gauge. In this aspect unwarranted vapors which might form explosive mixtures are confined to a portion of the gauge which performs mechanical functions only.

Accordingly, it is a principal object of this invention to provide an apparatus that mechanically gauges the level of a liquid confined in a tank or other container, that converts this data into electric intelligence and that transmits the data to a point remote from the tank.

Another object of the invention is to provide an apparatus capable at any instant of mechanically determining the level of liquid in a liquid storage tank and automatically, by electric means, transmitting that information to a location remote from the tank to actuate an alarm system if the level exceeds predetermined requirements.

Another object of the invention is to provide an apparatus for selectively and automatically gauging the levels of a liquid in a storage tank and further energizing an alarm and control system therefor at a location remote from the storage tank.

A further object of the invention is to provide an apparatus for gauging the level of a liquid stored in a tank that utilizes the phenomenon of liquid surface tension in the attainment of the liquid level data and which causes an electric pulse to be produced that is indicative of a liquid level which pulse may be used for several purposes.

It is a further object of the invention to provide apparatus for the determination of liquid level of a tank-confined liquid whereby when the liquid reaches a predetermined level electric intelligence thereof is instantly and automatically received at a central station to automatically control a liquid supply to the tank.

It is a further object of the invention to provide an apparatus of the type described which is characterized by a simplicity of design and possesses the requisite of ruggedness for practical use in remote field installations.

Another object of the invention is to provide an apparatus of the type described which is characterized by a high degree of accuracy, and is not impaired by changes in the specific gravity of the liquid in the tank, reasonable wear in any of the mechanical components employed, or by a combination of these factors.

Additional objects and advantages will become apparent from the following detailed description taken in conjunction with the accompanying drawings, in which:

FIGURE 5 illustrates a typical counter utilized as a high or low liquid level indicator or alarm device;

FIGURE 6 is a sectional view of FIGURE 2 along line 6—6 illustrating various features including the film data readout mechanism;

FIGURE 7 is an enlarged fragment of FIGURE 6 with the film data mechanism removed to illustrate the relation between the torque decrease triggering drive motor and the main data and drive shaft;

FIGURE 9 is a view of the left side of the mechanism illustrated in FIGURE 7, with the drive motor and some other parts omitted; and FIGURE 10 is an enlarged fragmentary sectional view taken along line 10—10 of FIGURE 9.

Figure 1:
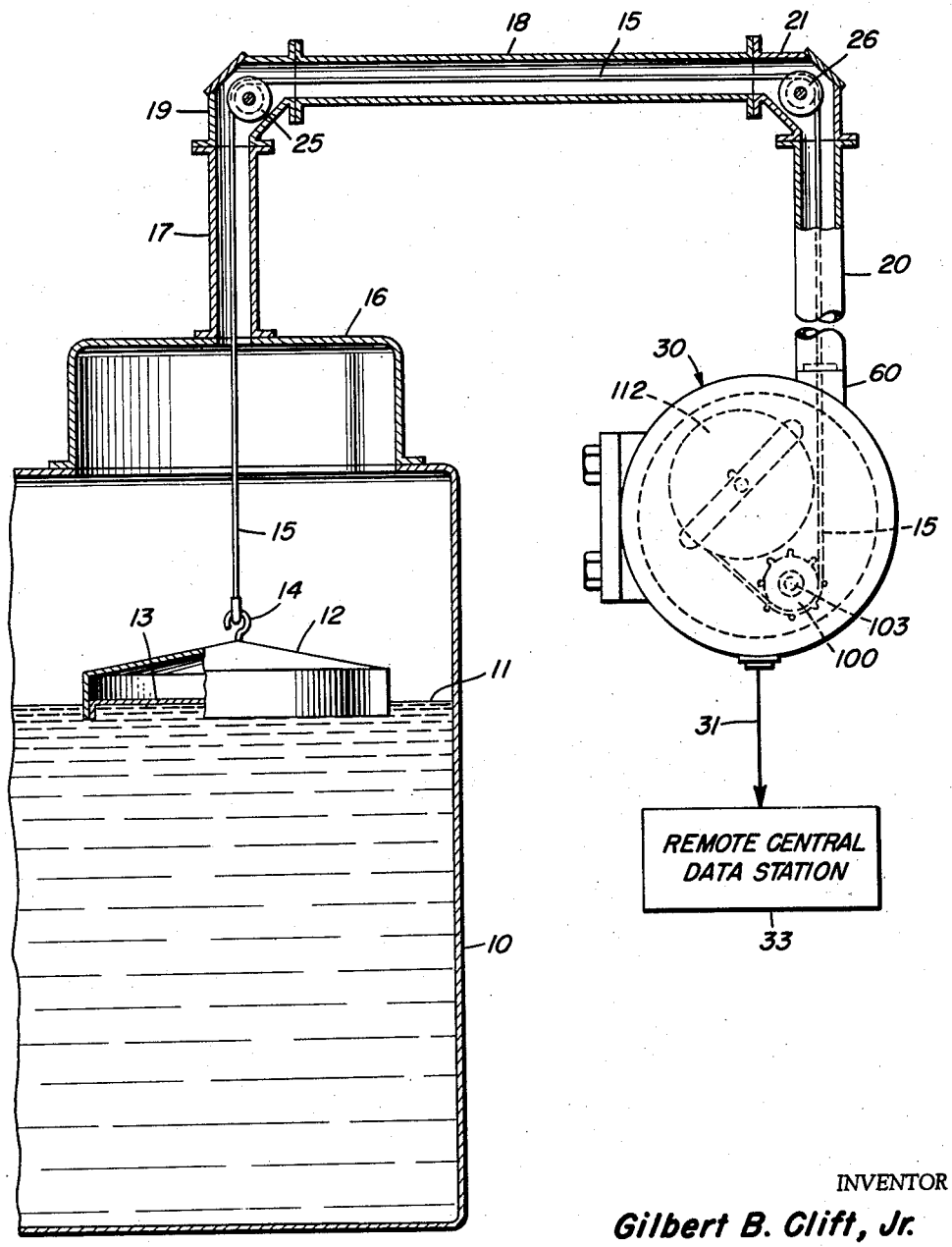
FIGURE 1 is a diagrammatic showing of one form of the invention employing a surface break detector.

Referring to the drawings in detail, and with particular reference to FIGURE 1, at 10 is shown a tank provided for containing a liquid indicated by numeral 11. A hollow conical float 12, characterized by a recessed bottom surface 13 rides or floats on the surface of the liquid 11. At the apex of the conical float 12 is a bolt or hook 14 to which is secured the end of a metal tape or cable 15. A housing 16 is welded or otherwise attached to the top of the tank 10 and is of a size sufficient to house the float when the tank is completely full of liquid. A vertically extending tube 17 is bolted or otherwise secured to the top of housing 16 at its center in registry with an opening formed therein. A horizontally extending tube of suitable length 18 is attached to tube 17 by means of a suitable elbow fitting 19. Another vertically extending tube 20 of a suitable length is secured to tube 18 by an elbow fitting 21 at its upper end and to a housing 30 at its lower end. A pulley wheel 25, conventionally mounted for free rotation is located in fitting 19 and correspondingly, a freely rotatable pulley 26 is mounted in fitting 21. The tape 15 extending upwardly from the float 12, as shown in FIGURE 1, passes over pulleys 25, 26 and passes freely through the several tubes 17, 18 and 20 and down into the housing 30.

Housing 30, which encloses the surface break detector mechanism, has an electrical cable 31 extending therefrom to a remote central data station 33.

Figure 2:
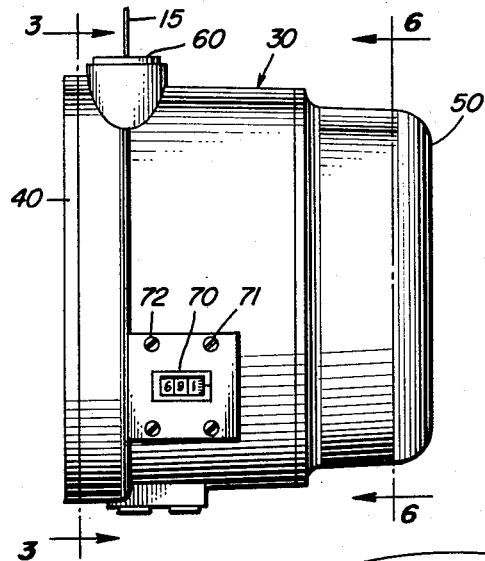
FIGURE 2 is a side view of the surface break detector or gauge from the mechanical dial indicator side of the liquid level gauge.
Figure 3:
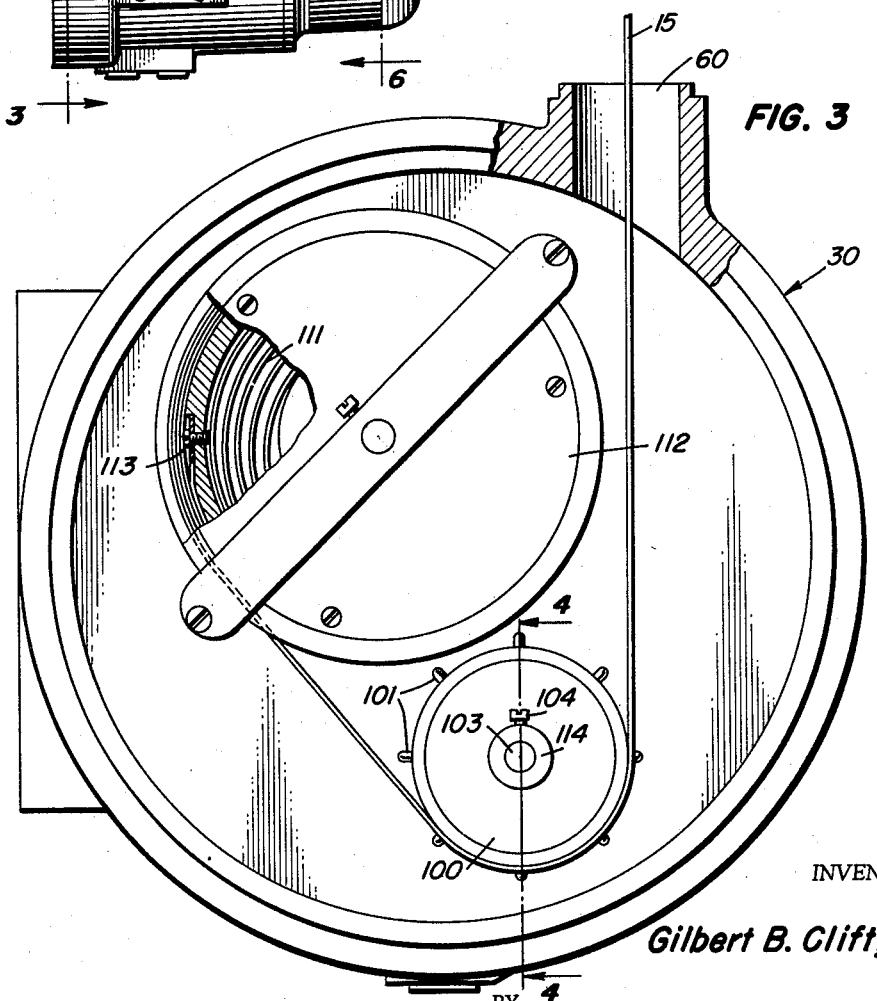
FIGURE 3 is a sectional view of the mechanical side of the gauge taken along a line 3—3 of FIGURE 2.

Referring now to FIGURES 2 and 3 the mechanical portion of the liquid level gauge or surface break detector will now be described. FIGURE 2 illustrates the housing 30 with cover 40 and cover 50 attached, illustrating the mechanical dial counter readout 70 of the gauge. FIGURE 3 is the left side view of FIGURE 2 with cover 40 removed from housing 30. Tape 15 passes through opening 60 in housing 30 over sprocket 100 to take up reel 112 which has a clock wound spring 111 which maintains constant tension on tape 15. Tape 15 is attached to take up reel 112 by a screw 113. The sprocket 100 is attached to the main data and drive shaft 103 by a screw 104 through boss 114 of sprocket 100. Shaft 103 as hereinafter described is freely rotatable by sprocket 100, except during operation of the torque decreased triggering motor drive 300 (which is best illustrated in FIGURES 6 and 7), so that as the liquid level 11 in tank 10 changes spring wound takeup reel 112 will wind or unwind tape 15 as required by the level of the liquid in tank 10. Sprocket 100 has sprocket pins 101 which engage spaced holes in tape 15 to provide positive contact therewith to rotate shaft 103 according to the change in liquid level 11 in tank 10.

Figure 4:
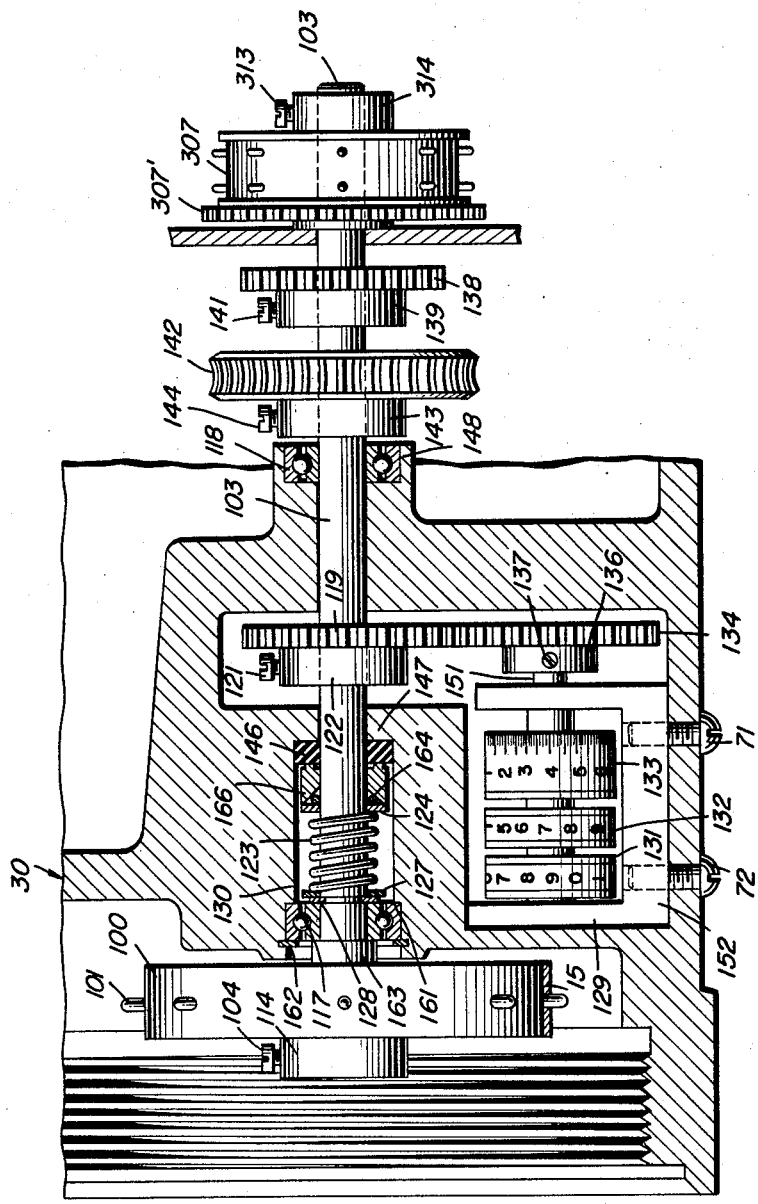
FIGURE 4 is a partial section taken along line 4—4 of FIGURE 3.

FIGURE 4 is a partial section, eliminating some parts, taken along the line 4—4 in FIGURE 3. The shaft 103, transferring mechanical position of sprocket 100, is sealed at the only through port 130 in the following manner. Ball bearing 117 is held firmly in the housing 30 by a machined shoulder 161 therein and an external retaining ring 162. The shaft 103, journaled in ball bearing 117, is prevented from axial motion by retaining ring 128 and shoulder 163 on sprocket 100. Spring 123, abutted from either side by washers 127 and 124, forces washer 127 against retainer ring 128 and washer 124 against O-ring 164. Rotary seal 126 is forced by O-ring 164, which seals shaft 103, against the rear seal 166 which is stationary with housing 30. Rear seal 166 is forced against O-ring 146 thereby being sealed at its outer diameter. The sealing arrangement just described pressure seals the mechanical side of the surface break detector (or liquid level gauge) against fluid or vapor entrained by the mechanical operation of the surface break detector away from the atmosphere around the gauge.

A second ball bearing 118 is provided for shaft 103 which is rigidly affixed, for example by cement, in recess 148. Ball bearings 118 and 117 provide shaft 103 freely rotatable support. Gear 119 having a boss 122 is rigidly affixed with screw 121 to the shaft 103. A dial indicator, generally referred to as 152, mounted to housing 30 by screws 71 and 72 has a shaft 151 to which is attached a gear 134 through its boss 136 by set screw 137. Gear 134 of the dial indicator is driven by gear 119 such that as the shaft 103 rotates dials 131, 132, and 133 of indicator 152 track the rotation. In this manner a direct indication of position of shaft 103, which indicates the height of the liquid 11 in tank 10, is continuously indicated by the indicator 152.

The indicator dial 133 is proportioned to indicate zero to 12 inches with each inch divided into eighths. If dial 133 makes one complete revolution it will change the indication on dial 132 by one digit. The dial 132 indicates one foot changes in the liquid level 11 of tank 10 and with one complete revolution will rotate dial 131 one increment, hence, it indicates ten foot changes in liquid level depth. Thus, the indicator 152 is capable of continuously displaying liquid level heights in the tank 10 from zero to 99 feet 12 inches.

It should be appreciated that only three dials are utilized in this particular indicator, however, it is a simple matter to replace the dial indicator 152 with one incorporating more or less dials.

On various occasions and when initially installed it will be necessary for dial 152 to be appropriately adjusted to reflect the proper height of the liquid in tank 11. This is readily achieved by releasing screws 71 and 72 (see FIGURE 2) and moving the dial indicator gear 134 until the appropriate height is indicated. After adjusting, screws 71 and 72 are tightened to re-engage gear 134 with gear 119. In other words, the dials 131, 132 and 133 are merely spun to indicate the appropriate height. Since each tooth on gear 134 represents an exact increment of height, e.g. one-eighth of an inch, accurate adjustment can readily be attained.

Under various circumstances it will be desirable to generate an alarm signal when the liquid level in tank 10 has reached certain heights, for example, when the liquid level is extremely close to the bottom of the tank, or when the liquid level is extremely close to the top of the tank. Sometimes it would even be desirable to operate an alarm or signal as various heights of the liquid level are achieved in tank 10. In order to provide these features a gear 138 having a boss 139 and a set screw 141 is attached to shaft 103. This gear, which is similar to gear 119, through various arrangements can be geared to a counter or position indicator, for example, similar to the one illustrated in FIGURE 5. The particular signal generating rotary counter generally referred to by the number 209 is mounted in housing 30 in any desirable manner such that the gear 200 carried by the shaft 213 of the rotary counter 209 meshes with gear 138 or any desirable train of gears from 138. Thus, the counter 209 indicates the position of shaft 103 and hence the level of the liquid in tank 10. The counter 209 is mounted to mounting plate 203 by screws 211 and 212. Likewise, a micro-switch generally described as 204 mounted to mounting plate 203 by screws 215 and 216. The micro-switch 204 has a contact 214 which is operationally engaged by the counter 209 at any desirable pre-set orientation. The micro-switch 204 also has electrical contacts 206, 207 and 208 which are utilized in electrically transferring data indicating that switch 214 has been operated or is not operated. The dial counter 209 may have a varying number of discs which rotate in a unit, tens or hundreds ratio. In order to orient the operations of micro-switch 204 at a desired position to shaft 103, set screw 202 may be loosened and shaft 213 rotated to reflect the proper orientation. Also, gear 200 could be disengaged and spun to proper orientation.

It should be appreciated that several dial counters similar to 209 could be incorporated through a gear train to operate off of gear 138 to provide signals at many other orientations of shaft position of shaft 103. Likewise, additional gears similar to 138 could be mounted on shaft 103. Also, it should be appreciated that the counter 209 could be provided with a wiper arm operating in a circular multi-contact block to provide an electrical indication of many other shaft positions through which shaft 103 might transgress.

On shaft 103 as depicted in FIGURE 4 is located a worm gear 142 having a solid portion 143 through which a set screw 144 engages shaft 103 to rigidly attach the worm gear 142. The worm gear 142, as hereinafter described, is engaged by the worm 301, illustrated in FIGURE 7, when a remote indication of the liquid level in tank 10 is desired at the remote central data station 33.

In order to provide an electrical signal indicative of the liquid level 11 in tank 10 at the remote central data station, a photoelectric readout system is provided as illustrated in FIGURE 6. The readout system consists of a film 306 which is coded to provide an electrical indication of the position of shaft 103 and thus the liquid level. The film 306 is transported between reel 304 and reel 303. The film 306 is perforated so that it will mesh with the sprocket pins on drive sprocket 307. The film 306 is threaded from reel 304 between the drive sprocket 307 and a guide 308 through a photoelectric readout device 309 over a second guide 312 and onto reel 303. The drive sprocket 307 is affixed to the main data and drive shaft 103 with a set screw 313 in boss 314 of the sprocket 307. The drive sprocket 307 carries a gear 307' which meshes with a gear 304' on reel 304. The gear 304' is also meshed with a gear 318 carried by reel 303. Through this gearing arrangement the sprocket 307 drives the reels 303 and 304 to transport the film 306 through the photo-electric readout device 309. Cables 316 and 317 conduct appropriate electrical information from the motor drive assembly 300 and the photoelectric readout device 309 to the electrical data transfer assembly 302 which is connected, as illustrated in FIGURE 1 through cable 31 to remote control data station 33. The photoelectric readout device as described is one of the well known types utilized in code film readout devices with associated scanning devices.

The main data and drive shaft 103 is freely rotatable to track movement of tape 15 attached to float 12 as the liquid level fluctuates. However, when it is desired at the remote central data station 33 to ascertain the liquid level in tank 10, the motor drive assembly generally referred to by the number 300 in FIGURES 6 and 7 which has a worm 301 must engage the worm gear 142 on shaft 103 to withdraw float 12 from the liquid in tank 10. To illustrate the engagement of worm 301 with worm gear 142, specific reference is made to FIGURE 7. A cam plate 401 is adjustably mounted on housing 30 by screws 404 and 406. A cam follower 402 is attached to arm 407 of solenoid 403 by a bolt 409 thereby being pivotally affixed to support frame 411. Support frame 411 has a pivot pin 408 journaled in support bracket 311 such that when solenoid 403 is energized by a signal from the remote central data station 33, cam follower 402 will ride up cam plate 401 rotating support frame 411 clockwise. As the frame 411 rotates clockwise the worm 301 engages the worm gear 142 which, as heretofore mentioned, is attached to shaft 103.

The description of the operation of the torque decrease triggering motor drive assembly can best be understood with reference to FIGURES 7 through 10. In order to operate the torque decrease triggering system to determine the liquid level in tank 10 at the remote central data station 33, the motor generally referred to by the number 500 must be operatively coupled to drive shaft 103 to lift float 12 free of the liquid 11 in tank 10. The torque decrease triggering motor 500 has attached to its armature an output drive shaft 505 rotatably mounted in bearing 502. Bearing plate 509 is rigidly mounted to stator 507 of motor 500 through spacers 503 and 504. The bearing plate 509 is journaled in bearing 508. As best seen in FIGURE 10 bearing plate 509 has an integral cylindrical bearing member 510 which is rotatably mounted on a cylindrical boss 520 which is integral with friction lever 521. Positioned between the friction lever 521 and frame 411 is a cupped spring washer 536 which surrounds the bearing 508 and exerts frictional pressure between the frame 411 and the friction lever 521. Bolt, washer and nut assembly 508′ adjustably secures the friction lever 521 and boss 520 in the bearing 508 and bearing plate 509 is free to rotate with respect to both the housing 411 and the friction lever 521. Bearings 502 and 508 are axially aligned and provide a rotatable mounting for motor 500.

Bearing plate 509 is restrained from free movement by spring 522 by an arm 524 attached adjustably by nuts 512 to stud 511 rigidly affixed to frame 411 by nut 511′. As heretofore described frame 411 is pivotally mounted with a pin 408 on bracket 311 and carries a cam follower 402 which rides cam plate 401 adjustably mounted on housing 30.

In operation, when it is desired to drive shaft 103, a signal from the remote central data station energizes solenoid 403 and motor 500. At this time the motor begins to turn worm 301 and the solenoid 403 pulls on the solenoid arm 407 causing cam follower 402 to traverse the cam surface on cam plate 401 thereby pivoting the frame 411 about the pin 408 in a clock-wise direction as depicted in FIGURE 7; hence, worm 301 engages worm gear 142 rotating shaft 103 to lift the float 12 from the surface of liquid 11 in tank 10.

Figure 8:
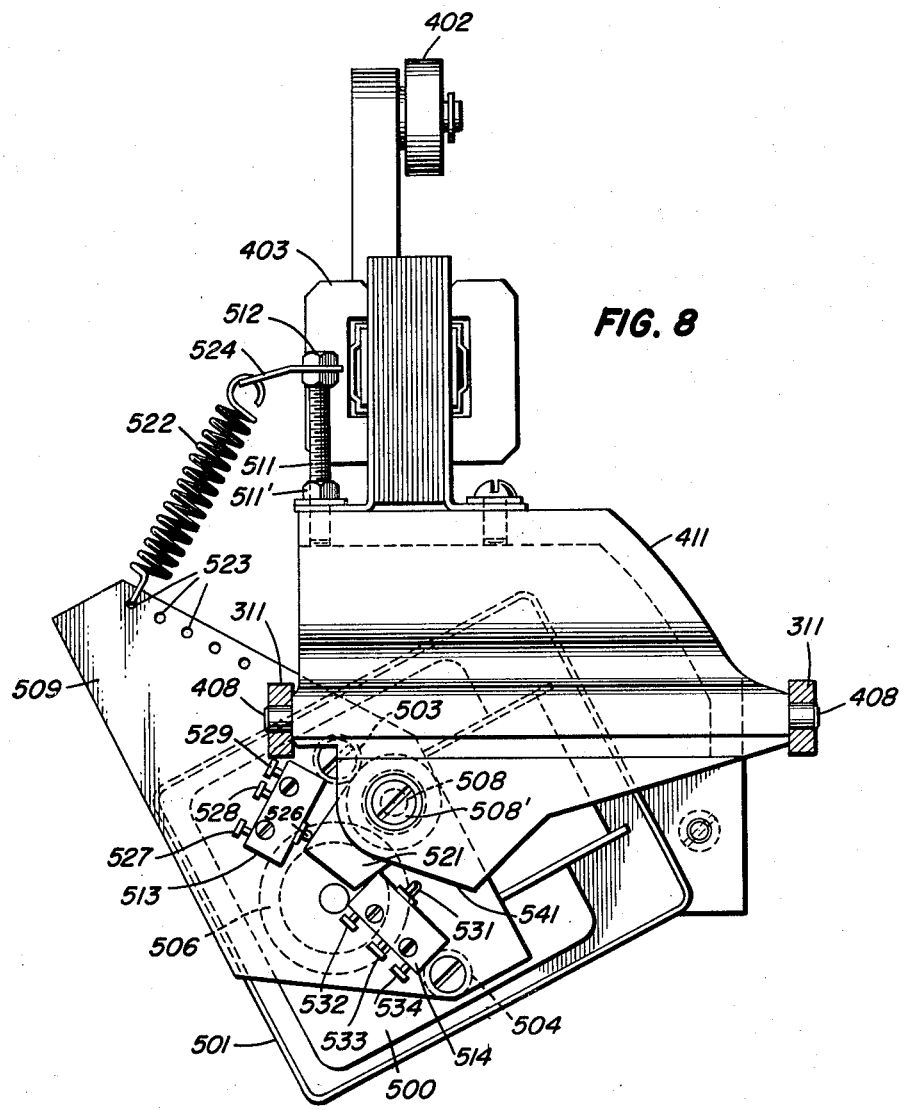
FIGURE 8 is a right side view of the mechanisms illustrated in FIGURE 7.

Since the motor 500 must develop a torque to drive shaft 103 and withdraw the float 12 from liquid 11, the motor armature 506 with output shaft 505 and stator 507 tend to rotate in opposite directions. However, the stator 507 is affixed rigidly to bearing plate 509 and restrained from movement by spring 522. Thus the torque force on the stator 507 is stored in spring 522. As mentioned hereinbefore the float requires a higher torque force to overcome the surface tension of the liquid 11 in tank 10 than is necessary to lift the float in free air; hence, as the float breaks free of the surface, the liquid 11 surface tension force is dissipated and the motor drive 500 decreases the torque output to worm wheel 301 which in turn results in a decreased torque force on stator 507. As the torque observed on stator 507 decreases, spring 522 contracts since its force requirements to restrain stator 507 are decreased, thus bearing plate 509 rotates clockwise from its counter-clockwise position as depicted in FIGURE 8. From the above description, it will be realized that plate 509 as viewed in FIGURE 8 rotates counter-clockwise about a pivot axis, provided by bearing 508 and output drive shaft 505, to an extreme position as the torque output on worm 301 increases, and then, as the surface tension force on float 12 is overcome, the decrease in torque output of worm 301 will be reflected as a clockwise rotation of bearing plate 509 since it is rigidly affixed to stator 507 and restrained by stored energy of spring 522 which is expended to rotate bearing plate 509. This is best illustrated in FIGURE 8.

It will be understood as the detailed description further unfolds that numbers used for a particular part are identical in all figures incorporating that part. In this regard, the description of the torque decreased triggering event will now be described so that the height sensing of the liquid level in tank 10 at the remote central data station through the indicator or control circuit may be understood. This part of the description can best be understood with reference to FIGURES 7–10. On the bearing plate 509 is adjustably mounted micro-switch 513 having actuator contact 526 and electrical contacts 527, 528 and 529. Also mounted on bearing plate 509 is a micro-switch 514 with actuator contact 531 and electrical contacts 532, 533 and 534. Mounted in bearing 508 is a friction lever 521 which extends parallel to bearing plate 509 and is located between micro-switch 513 and micro-switch 514. The arrangement of bearing 508 and lever 521 can best be understood with reference to FIGURES 9 and 10.

Control circuit cable 316 supplies power to motor 500, solenoid 403 and microswitches 513 and 514. The switch 513 is the surface break switch which indicates a decrease in torque on the motor drive 500. Micro-switch 514 provides an overload interrupt switch to disable motor 500 if an abnormal load is incurred.

In operation after the solenoid 403 and motor 500 have been energized, stator 507, under the motor 500 load, rotates the bearing plate 509 counter-clockwise as viewed in FIGURE 8 thereby forcing contact 526 of the surface break switch 513 to contact friction lever 521 thereby reflecting a closed arrangement of contacts 527, 528 and 529. As the bearing plate 509 continues to rotate under an increased load friction lever 521 is rotated with bearing plate 509 until restraining spring 522 absorbs the torque force on bearing plate 509. At this time the friction on lever 521 maintains contact 526 closed. When the float 12 is withdrawn from the liquid 11 in tank 10 (see FIGURE 1) the surface tension force on float 12 will be dissipated reflecting a decrease in torque requirement on motor 500 which in turn decreases the torque exerted on bearing plate 509 permitting restraining spring 522 to rotate the bearing plate 509 clockwise (as viewed in FIGURE 8), thus rotating surface break switch 513 clockwise therewith; however, friction lever 521 is held by the friction between the frame 411 and friction lever 521 thereby causing the contact 526 of surface break switch 513 to open reflecting an open condition at the electrical contacts 527, 528 and 529. It should be realized that bearing plate 509 is not required to return to the position it occupies when motor drive 500 is de-energized before contact 526 becomes open. After the indicating or control circuit has transmitted appropriate information to the remote central data station 33, the solenoid 403 and the motor drive 500 are de-energized. Because of the arrangement of motor drive assembly 300 when the solenoid 403 becomes de-energized cam follower 402 rides down the cam plate 401 causing the motor drive assembly to rotate counter clockwise about pin 408 as viewed in FIGURE 7 thereby disengaging the worm 301 from worm gear 142. After the worm 301 is disengaged from the worm gear 142, shaft 103 is returned to a freely rotatable status to fluctuate with changes in the liquid level 11 in tank 10. Also, after motor 500 has been de-energized, restraining spring 522 rotates bearing plate 509 to its normal position. At this time the overload micro-switch 514 which is affixed to bearing plate 509 contacts friction lever 521 forcing it to rotate clockwise with bearing plate 509 thereby moving it into position to be contacted by the surface break switch 513 at contact 526.

Another function of the overload switch 514 is to provide a de-energizing signal for the motor 500 if restraining spring 522 fails to function or the motor 500 incur an excessive torque. Assuming that an excessive torque is produced by motor 500 which is reflected to bearing plate 509 against restraining spring 522, the contact 531 on overload micro-switch 514 will be forced against frame 411 at a point generally designated 541 thereby closing contact 531 providing an electrical signal to the indicating and control circuit and de-energize the motor drive 500 by opening the electrical circuit to the motor.

It should be appreciated that the torque decrease triggering motor device described in the above surface break detector or liquid level gauge senses a decrease in torque on its output shaft after the initial increasing torque is slightly decreased.

It should be appreciated that the present invention encompasses a broad scope of liquid level metering and detecting devices and various rotary contacts and circuits can be readily incorporated into the principles of the present invention to provide signals indicating the condition of the liquid level in various tanks among a tank farm which utilizing appropriate circuitry can perform various control and alarm functions.

Although the invention has been shown and described in detail with several representative embodiments the invention is not intended to be limited thereto, but is susceptible of numerous changes in form and detail which are considered to be within the scope of the appended claims.

What is claimed is:

1. Apparatus for gauging the level of a liquid in a container comprising means to be withdrawn from the liquid and having a design requiring a greater force to withdraw it free of the liquid than is required to support its dead weight, a normally tensed flexible element connected to said means, lifting means including rotary means engaging said flexible element to withdraw said means from the liquid, means maintaining said flexible means under sufficient tension to maintain it free of slack, said lifting means further comprises a motor having a normally stationary part, means yieldably restraining said normally stationary motor part against limited movement from a first position, said motor part having indicator circuit control means mounted thereon normally occupying a first indicating state, said normally stationary motor part moving in response to said greater withdrawal force to a second position thereby moving said indicator circuit control means to a second indicating state, said motor part being returned intermediate said first and said second position by said yieldable restraining means as soon as said first mentioned means is free of the liquid, said indicator circuit control means being restored to its said first indicating state.

2. The structure as defined in claim 1 wherein said flexible element comprises a metallic tape having spaced apertures therein, and said rotary means comprises a sprocket wheel and said motor part comprises an electric motor stator structure.

3. Apparatus for gauging a liquid confined in a container comprising a unitary member to be withdrawn from the surface of the liquid, said member being of such shape as to require a greater force to withdraw it from the liquid than is required to support its dead weight, a flexible element connected to said member, lifting means to withdraw said member from the liquid comprising pulley means engaging said flexible element, motor means, means supporting said motor means for limited arcuate movement, said motor means including two members, said pulley means disengageably engaged by one of said motor means, spring means normally yieldably holding said second motor member against said limited movement, indicating means driven by said motor means, means on said second motor member moved by means on said motor support means energizing said indicating means when said second motor member moves under increased torque against the restraint of said spring means to drive said indicating means, said spring restraining means reversing the movement of said second motor member immediately after said unitary member is withdrawn from the surface of the liquid due to the suddenly reduced torque load on the motor means thereby actuating a readout signal of said indicating means.

4. Apparatus for gauging the level of a liquid in a container comprising float means to be withdrawn from the surface of the liquid and having a design requiring a greater force to withdraw it free of the liquid than is required to support its dead weight, a flexible metallic, apertured tape connected to said float means, a sprocket means engaged by said flexible tape, spring biased take-up means to maintain said tape free of slack, motor means, means supporting said motor means for limited arcuate movement, said motor means comprising a rotatable driving member disengageably connected to said sprocket means and a normally stationary stator member, spring means yieldably restraining said normally stationary stator member against limited arcuate movement from a first position, said stator member having indicator circuit control means mounted thereon normally occupying a first position, said normally stationary stator member movable arcuately in response to said greater withdrawal force thereby moving said indicator circuit control means to a second position, said stator member being returned intermediate its initial stationary first position by said yieldable spring means as soon as said float means is free of the liquid in the container, said indicator circuit control means being operated to produce a control signal, and thereafter said stator member and said control means being returned their respective first positions.

5. A torque decrease triggering device in a motor assembly driving a load subjecting a motor to sudden decreases in torque requirements that are desirable to be sensed comprising a motor member having a normally stationary motor stator member, said stator member mounted for arcuate movement, spring means yieldably restraining said stator against limited arcuate movement from a first position, said stator member having indicator circuit control means normally inactivated, said normally stationary motor stator member movable arcuately in response to a load on said motor thereby activating said indicator circuit control means, said motor stator member being returned intermediate its initial first position by said spring means when the torque output requirement of said motor member is decreased thereby operating said indicator control means to produce a control signal, said stator member and said control means thereafter being returned to their initial status.

6. The structure as defined in claim 5 wherein a support structure means rotatably supports said motor member, said support structure means including a member providing a flat support surface adjacent to said motor stator, a friction lever pivotally mounted on said flat support surface for movement relative to the stator, said circuit control means on said motor stator being mounted to move in the plane of said friction lever so as to engage said friction lever during the limited arcuate movement of said stator member to activate said control circuit and abutment means on said stator member engageable with said friction lever means whereby said abutment member moves the friction lever with the stator member during the return of the stator member to its said first position thereby deactivating said control means.

7. An apparatus for indicating a decrease in torque of a motor driving a load comprising a motor including a stator pivotally mounted by a frame means at one end about its armature shaft and at the other end by a bearing plate rigidly attached to said stator, said stator restrained from rotation by a spring means, said bearing plate having circuit control means rigidly affixed thereto, actuator means attached to said frame means engageable rotated by said circuit control means in one direction when said stator rotates against said restraining means in said one direction, said actuator means being free from rotation of said circuit control means when said motor undergoes a torque decrease allowing said restraining spring means to rotate said stator in the opposite direction thereby causing an output signal from said control means, and means to reset said actuator means for engageable rotation with said circuit control means.

References Cited in the file of this patent

UNITED STATES PATENTS

| | | |
|---|---|---|
| 1,188,793 | Kuludjian | June 27, 1916 |
| 1,888,533 | Jauch et al. | Nov. 22, 1932 |
| 2,387,533 | Schmucker | Oct. 23, 1945 |
| 2,627,660 | Smith | Feb. 10, 1953 |
| 2,814,798 | Hosmer et al. | Nov. 26, 1957 |
| 2,930,131 | Mayes | Mar. 29, 1960 |
| 2,936,954 | Raymond | May 17, 1960 |

FOREIGN PATENTS

| | | |
|---|---|---|
| 1,088,196 | France | Sept. 8, 1954 |
| 781,022 | Great Britain | Aug. 14, 1957 |